US012670181B2

(12) United States Patent

Gordhandas et al.

(10) Patent No.: US 12,670,181 B2

(45) Date of Patent: Jun. 30, 2026

(54) AUTOMATIC DATA RETRIEVAL AND SYNCHRONIZATION BASED ON CRAWLING AND INDEXING PRIVATE API DATA

(71) Applicant: Zapier, Inc., San Francisco, CA (US)

(72) Inventors: Ankit Gordhandas, San Francisco, CA (US); Bryan Helmig, San Francisco, CA (US); Matthew Plachter, San Francisco, CA (US); Reid Robinson, San Francisco, CA (US); Ryan Dunnewold, San Francisco, CA (US); Simon Charette, San Francisco, CA (US); Sinchan Banerjee, San Francisco, CA (US); Sean Pitstick, San Francisco, CA (US); Tal Peretz, San Francisco, CA (US); Taylor Halliday, San Francisco, CA (US); Vitor Balocco, San Francisco, CA (US); Benjamin Kempe, San Francisco, CA (US)

(73) Assignee: Zapier, Inc., San Francisco, CA (US)

( * ) Notice: Subject to any disclaimer, the term of this patent is extended or adjusted under 35 U.S.C. 154(b) by 0 days.

(21) Appl. No.: 18/963,094

(22) Filed: Nov. 27, 2024

(65) Prior Publication Data

US 2025/0181603 A1 Jun. 5, 2025

Related U.S. Application Data

(60) Provisional application No. 63/605,320, filed on Dec. 1, 2023.

(51) Int. Cl.
| | |
|---|---|
| *G06F 16/00* | (2019.01) |
| *G06F 16/27* | (2019.01) |
| *G06F 16/951* | (2019.01) |

(52) U.S. Cl.
CPC ............ *G06F 16/27* (2019.01); *G06F 16/951* (2019.01)

(58) Field of Classification Search
CPC ............................... G06F 16/27; G06F 16/951
See application file for complete search history.

(56) References Cited

U.S. PATENT DOCUMENTS

| | | | |
|---|---|---|---|
| 8,255,895 B2 * | 8/2012 | Gates ................... | G06F 16/182 |
| | | | 717/172 |
| 10,380,185 B2 * | 8/2019 | Jin ........................ | G06F 9/4881 |

(Continued)

FOREIGN PATENT DOCUMENTS

| | | | | | |
|---|---|---|---|---|---|
| MY | | 185645 A | * | 5/2021 | |
| WO | WO-2025071703 A1 | * | 4/2025 | ............... | G06N 3/08 |

OTHER PUBLICATIONS

International Search Report and Written Opinion mailed Jan. 24, 2025, for International Application No. PCT/US2024/057838 filed Nov. 27, 2024. (9 pages).

*Primary Examiner* — Alexander Khong

(74) *Attorney, Agent, or Firm* — Goodwin Procter LLP

(57) ABSTRACT

A method and system for automatic data retrieval and synchronization is disclosed. In some embodiments, the method includes receiving a selection of an application from a plurality of connected applications. The method also includes determining, using one or more trained artificial intelligence (AI) models, an action to be performed on the selected application, retrieving data used to perform the action from the selected application, including automatically fetching new data updates of the selected application, and performing the action to generate a result based on the retrieved data. The method further includes automatically (Continued)

transferring the new data and the result to remaining applications of the plurality of connected applications for synchronization.

20 Claims, 15 Drawing Sheets

(56) References Cited

U.S. PATENT DOCUMENTS

| | | | |
|---|---|---|---|
| 2019/0081865 A1 | 3/2019 | Schrupp et al. | |
| 2019/0146997 A1* | 5/2019 | Jin ........................... | G06F 9/46 |
| | | | 718/104 |
| 2019/0370263 A1 | 12/2019 | Nucci et al. | |
| 2022/0027317 A1* | 1/2022 | Aziz .................... | H04W 12/08 |
| 2022/0343250 A1 | 10/2022 | Tremblay et al. | |
| 2024/0061845 A1* | 2/2024 | Katariya ............ | G06F 16/2477 |

* cited by examiner

100

200

332

Hubspot Data Source Status

Operational

 Hubspot Account Connected

Oauth flow completed and connected to Hubspot account hubspottest@hubspot.com

 Initialize: Sync all Hubspot details

Tasked flow transfer infrastructure to sync all available deals. 10, 000 deals found and synced.

 Identify properties for semantic search

Created search embeddings for 10,000 deals

 Fetching updates from Hubspot and sync

Fetching updates from Hubspot, identifying diffs, calculating search embeddings, and syncing via Transfer infrastructure every 10 seconds.

FIG. 3D

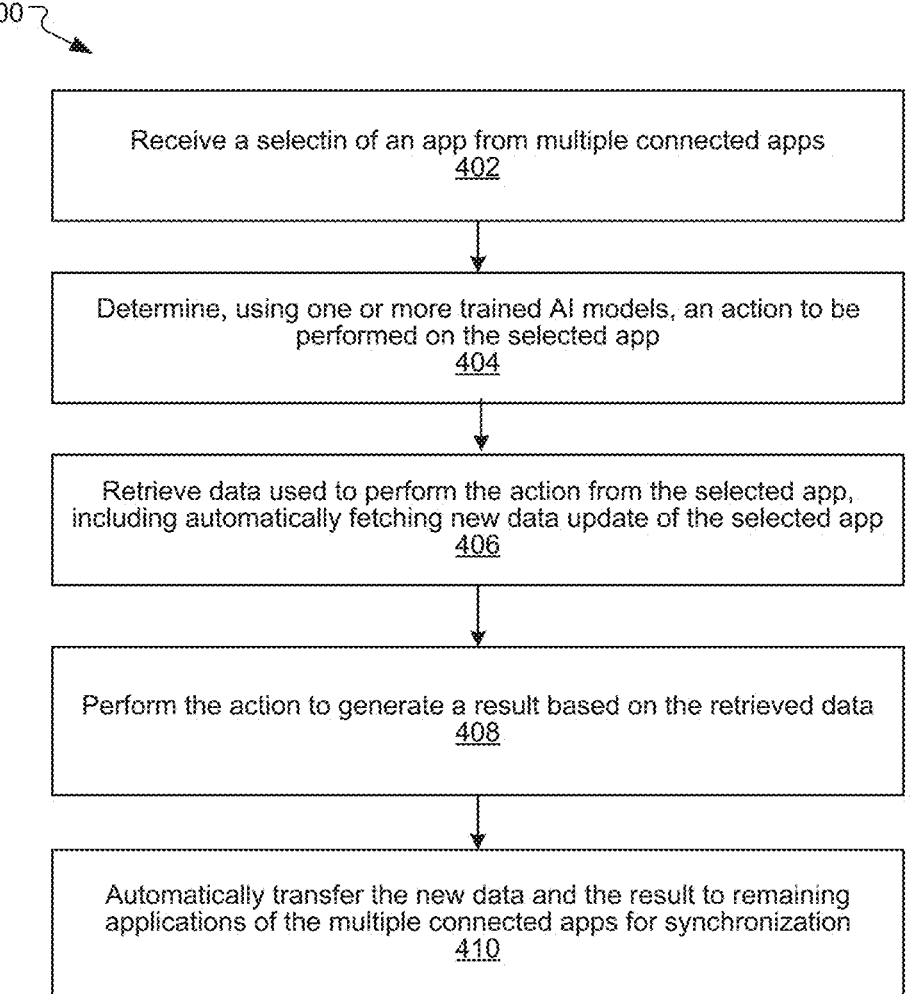

400

Receive a selectin of an app from multiple connected apps
402

Determine, using one or more trained AI models, an action to be performed on the selected app
404

Retrieve data used to perform the action from the selected app, including automatically fetching new data update of the selected app
406

Perform the action to generate a result based on the retrieved data
408

Automatically transfer the new data and the result to remaining applications of the multiple connected apps for synchronization
410

FIG. 4

AUTOMATIC DATA RETRIEVAL AND SYNCHRONIZATION BASED ON CRAWLING AND INDEXING PRIVATE API DATA

CROSS REFERENCE TO RELATED APPLICATION

This application claims the benefit of U.S. Provisional Patent Application No. 63/605,320, titled "Automatic Data Retrieval and Synchronzation based on Crawling and Indexing Private API Data," and filed on Dec. 1, 2023, the entire content of which is incorporated by reference herein.

TECHNICAL FIELD

This disclosure relates to a data retrieval and synchronization system that can crawl and index private application programming interface (API) data for retrieval and synchronize data based on bulk data retrieval.

BACKGROUND

Applications and associated data power the way that various tasks get implemented in a computer and network environment. Manually integrating countless applications is slow, costly, or even impractical for some users (e.g., business users, personal users). Although platforms are being developed to connect different applications and services to automate workflows, these platforms often lack the ability to keep data in synchronization (sync) and up-to-date with APIs. It is also difficult to perform bulk data retrieval from API endpoints and build a flat solution when APIs vary widely.

SUMMARY

To address the aforementioned shortcomings, a method and a system for automatic data retrieval and synchronization are disclosed herein. The method receives a selection of an application from a plurality of connected applications. The method determines, using one or more trained artificial intelligence (AI) models, an action to be performed on the selected application. The method also retrieves data used to perform the action from the selected application, including automatically fetching new data updates of the selected application. The method performs the action to generate a result based on the retrieved data. The method further automatically transfers the new data and the result to remaining applications of the plurality of connected applications for synchronization.

A large amount of data among the plurality of connected applications is bulk-transferred at one time or on a regular basis. Prior to the new data updated on the selected application, the selected application is populated with existing information using bulk transfer. One or more automation flows are created to establish data connections between the plurality of connected applications, and the data is retrieved from the selected application based on the data connections between the plurality of connected applications. A semantic search is performed on data received from the plurality of connected applications through the data connections. To create the one or more automation flows, one or more user interfaces are generated to provide instructions and receive user input for configuring one or more trigger events and one or more subsequents action performed upon receiving the one or more trigger events. The one or more AI models are trained through natural language processing and machine learning to determine the action to be performed.

In some embodiments, the data is retrieved from the selected application using embeddings and one or more vector indices. In some embodiments, the one or more automation flows are created using one or more AI models, and the one or more AI models are trained to provide parameters or input required for creating the one or more automation flows to reduce manual operations. In some embodiments, the action is included in a natural language instruction, and the result is a natural language answer generated from performing the action.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

FIGS. 3A-3K illustrate example use cases for performing data retrieval and sync based on integration of automated workflow with HubSpot, according to some embodiments.

FIG. 4 illustrates an exemplary flowchart for performing automatic data retrieval and synchronization, according to some embodiments.

DETAILED DESCRIPTION

Figure 1:
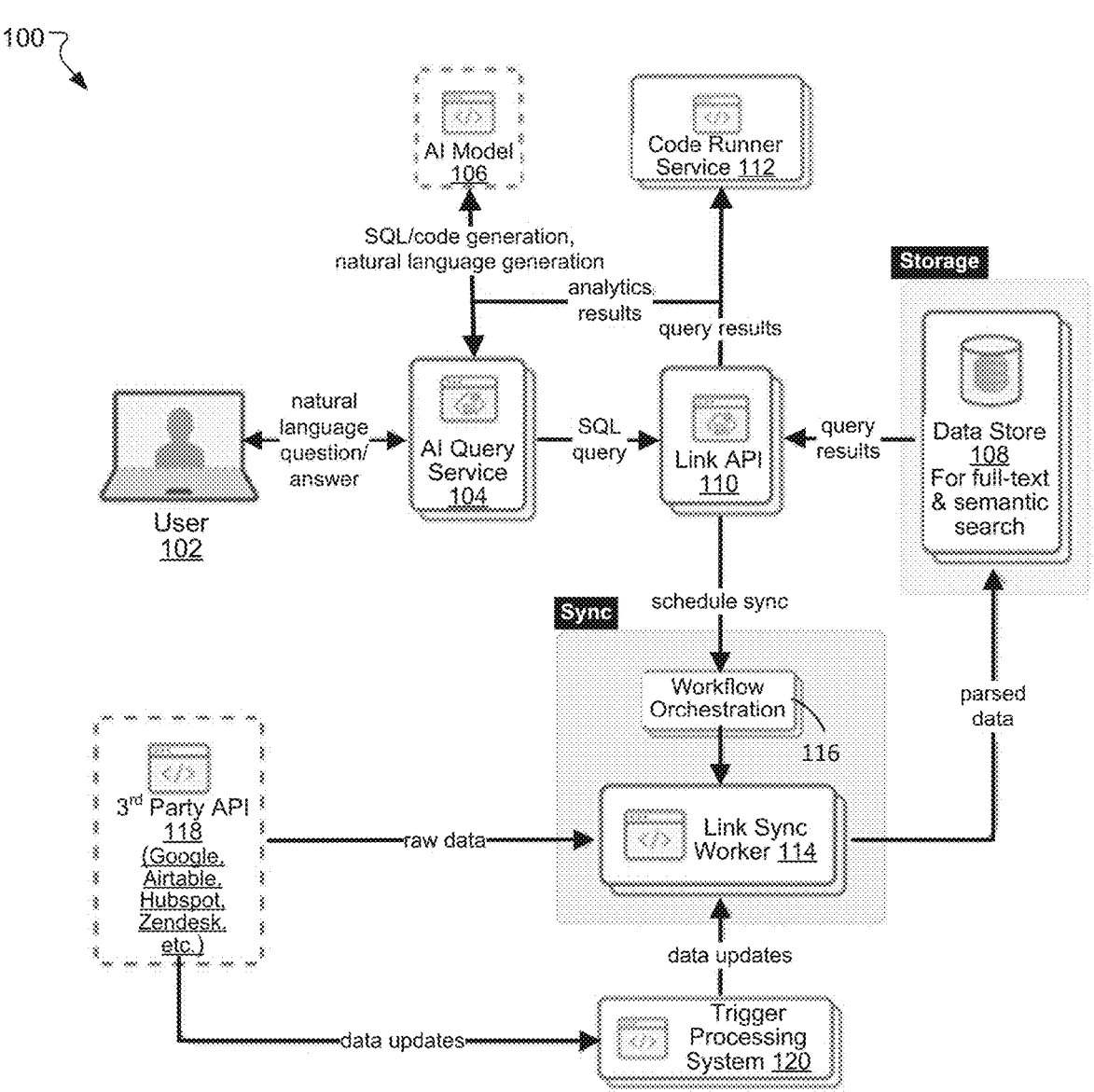
FIG. 1 illustrates an exemplary diagram of an overall automation system, according to some embodiments.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Existing platforms face some technical challenges in bulk data retrieval and data synchronization. First, software as a service (SaaS) applications do not offer useful API search endpoints. The applications are also referred to as "apps" hereafter. For example, SaaS apps only provide limited search or data analysis options. SaaS apps do not provide semantic options, and the number of results is restricted. Such API endpoints may prevent the retrieval of large amounts of data in bulk. In other words, the current API endpoints do not support extensive retrieval, causing users to manually load bulk data.

The existing platforms lack the ability to export large amounts of data in bulk, limiting the ways that users can do with the data. For example, an existing platform may not expose bulk data (e.g., 10,000 items) for exporting, or such data/items are not pre-embedded. As a result, a private crawler may be needed for exporting the data. As described herein, the present system can crawl and index private API data for retrieval and then store and retrieve the exported data from any apps.

Third-party apps in the existing platforms do not have data analysis or semantic search endpoints such that users cannot access the bulk data behind the APIs. Because users cannot search by keyword through the APIs, this restricts the types of retrieval and operations users can perform. In addition, an object storage service (OSS) retrieval plugin may be highly technical, for example, when customizing based on various types of user data. The existing platforms cannot send notifications to keep context up-to-date, making it difficult to keep track of changes in data.

The present disclosure describes a retrieval and synchronization system that can (1) crawl and index private API data for retrieval and (2) bulk import data and keep database(s) up-to-date. In some embodiments, the present system may leverage an automation platform (e.g., trigger infrastructure described below) to keep one or more databases up-to-date with the data retrieved from private APIs. Data may be retrieved, e.g., based on vector embeddings, from any SaaS tool. A SaaS tool is a product accessed through a cloud-based system that provides features to streamline business functions. For example, the present system may use embeddings and one or more vector indices to perform data retrieval and keep a database (e.g., PostgreSQL database) up-to-date with the retrieved data. Like a search engine (e.g., Bing®, Google Search®) that can organize information and make the information universally accessible and useful, the present system can implement similar functionalities for authenticated APIs.

The present system benefits the technical field of efficient and effective bulk data synchronization (sync) and retrieval based at least on the following key features. Advantageously, the present system supports numerous different apps in a flat, consistent manner. The present system maintains up-to-date data/information in an automation system and enables real-time notifications on changes to an index. The present system is agnostic to data shapes. For example, it accepts arbitrary Javascript object notation (JSON). In the present system, a search is conducted over all crawled data, which is not limited to native search endpoints provided by the apps or APIs. For non-technical users (e.g., ordinary users rather than developers), no coding is required for configuration or indexing in the present system.

System Overview

The underlying technology described herein provides the capability to crawl and index private API data for retrieval and to perform the retrieval from any SaaS tool, e.g., using embeddings and vector indices. Additionally, the present system can bulk import and keep a vector database up-todate, where the database can then be queried via an API to return results to one or more AI models (e.g., a large language model (LLM)).

In some embodiments, the present system may leverage an automation platform, specifically a trigger infrastructure, to synchronize database(s) with data from private APIs. In some embodiments, the present system is implemented based on an automation platform combined with an effective retrieval mechanism.

Automation Platform

The automation platform described herein allows a user to select two or more apps and connect the selected apps to customize and automate repetitive tasks. For example, this automation tool can be configured to automatically generate and send out a custom tweet after a user publishes a post, in response to receiving a one-time input from the user. The automation platform connects thousands of applications such that different types of actions may be customized and created. For example, the automation platform allows users to share new posts on LinkedIn®, add events of selected apps to Google Calendar®, receive alerts in Slack® when the user receives emails with attachments automatically downloaded to Dropbox®, etc. Example apps include Asana®, Azure DevOps, Chime®, Google Calendar®, Google Docs®, Instagram®, LinkedIn®, Slack®, Reddit®, etc.

In some embodiments, to build customizable integrations and workflow automations, the automation platform described herein may create fully customizable automations that connect different apps and services. The automations may allow the system to automatically and in real-time synchronize important data between applications/platforms, migrate historical data, manage data transfers, etc. The present automation platform benefits in various aspects such as bulk loading of historical data via transfer, data storing for data-driven automation via tables, utilizing page builder and chatbot builder via interfaces, etc.

In some embodiments, no-code and visualized approaches are used in the present automation platform, such that an individual user does not need to write any software code to create and maintain a customizable automation. For example, one or more AI models may be trained to provide the required parameters or input for a user to minimize the amount of manual operations, thereby significantly increasing the accuracy and efficiency of automation creation. However, if a user wants to handle multiple API requests in a single automation/action or add some other unique features, the present automation platform also provides a coding interface for the user to run his/her code to create automations.

FIG. 1 illustrates an exemplary diagram 100 of an overall automation platform. The present platform may link various applications, transfer data, and realize process automation by automatically linking and synchronizing the actions of the apps and services, so that recurring processes can be executed automatically. In some embodiments, an artificial intelligence (AI)-driven approach may be applied in the present system. For example, in FIG. 1, a user 102 may initiate an AI query service 104 by posing a question via an app installed on a specific platform. This question can be a request for creating a customizable workflow automation, a request for parameter(s) used in creating the workflow automation, or any other questions relevant to workflow automation and customization. In response, the present system may utilize one or more AI models 106 to perform the AI query service 104. For example, an AI tool engine (not shown) may be included in AI models 106 and deployed to access and exchange data with a data store 108 through a link API 110. In some embodiments, link API 110 may include a structured query language (SQL) engine. Based on user 102's question, the SQL engine may generate an SQL query and pass it to data store 108 via link API 110. Data store 108 may process the stored data (e.g., by performing text and semantic search on the data) and return one or more query results to link API 110. For example, the query result may include parameters associated with one or more tasks of the workflow automation. In some embodiments, the present system may forward the query results to a code runner service 112 to generate analytics results, which may be used by the AI tool engine to output an answer to user 102. The code runner service 112 may include a secure, cloud-based platform to execute arbitrary software code in isolated sandboxes. The present system may use the code runner service to run AI-generated code for data analysis and visualization on the datasets in a controlled environment, ensuring data privacy and security.

The data stored in data store 108 may be retrieved from thousands of linked apps. As depicted, a link sync worker 114 may allow the present system to connect to the thousands of apps, retrieve data from the linked/connected apps, and update the retrieved data to keep the data synchronized in constructing workflow orchestration platforms 116 for users. For example, link sync worker 114 may connect to third-party apps (e.g., Google®, HubSpot®) using third party API 118 to obtain raw data. When receiving the raw data from one or more of the connected apps, link sync worker 114 can transfer the received data to the remaining connected apps to ensure every connected app is updated with the received data. In some embodiments, link sync worker 114 may use embeddings and at least one vector index to perform data retrieval and keep the data store 108 up-to-date with the retrieved data.

A trigger processing system 120 may also receive data updates (e.g., new trigger data), process the data, and send the processed data to link sync worker 114 to be synchronized and maintained consistently across different apps and platforms. An automated workflow may include one or more trigger events and one or more subsequent automated actions, such that when a task is triggered at one point, an action can be performed at a subsequent point. When receiving data updates from the third party API 118, trigger processing system 120 may identify a trigger event (e.g., an email from a first application) and cause an action configured in the automated workflow to be performed (e.g., the execution of a specific script in a second application). The trigger processing system 120 may then cause linker worker 114 to synchronize the connected apps and platforms with the updated data (e.g., including the email and the execution result). The trigger event and automated actions will be described in detail below.

It should be noted that each of the blocks (e.g., 104-120) in FIG. 1 as well as any engines/modules described in FIGS. 2-5 below corresponds to a system component or a subsystem that may be implemented by hardware, software, and/or a combination thereof.

It should also be noted that an automated workflow as described herein may be configured to perform a custom action that signals and controls the operation of one or more hardware devices when a specified trigger condition is met. For example, a trigger may be configured as receiving a notification in a first app that a user is within a threshold distance from a particular location at a particular time, and an action may be configured as executing, in one or more second apps, instruction(s) and/or commands that control the operation of one or more hardware devices. A user's mobile device (e.g., smartphone) generally includes a transceiver that communicates with cell towers, satellites, Wi-Fi stations, etc., such that the location of the mobile device and the user carrying the mobile device can be determined based on transceiver communications using techniques such as cell tower triangulation, global positioning system (GPS)-based tracking, Wi-Fi based tracking, etc. The first app may be a geolocation app installed on the user's mobile device to show the user's real-time location. A trigger event occurs, meaning a notification pops up in the geolocation app showing that the user is in the nearby of his/her home at dinner time. The one or more second apps may be part of intelligent home systems that, when instructions or commands in the apps are executed, control the operations of smart home devices such as turning on/off an air conditioner, operating a device to play music, etc. Here, once a user goes back home after work and is close to home around a certain time, the customized action, i.e., the one or more instructions in the one or more second apps, will be automatically executed and act as control signals to turn on the air conditioner, to have an audio player to play music, etc.

Data Connection between Applications

The present disclosure allows automation or automated workflow that links together users' apps. In some embodiments, this includes two fundamental functions: a trigger and one or more subsequent automated actions. The trigger is the first event that sets the automated workflow in motion and starts the action that has been set up. In other words, a task is triggered at one point so that an action is performed at a subsequent point.

In some embodiments, the present automation platform allows a user to create automation, e.g., establish the data connection between applications/services, using an artificial intelligence (AI)-powered builder, a pre-built builder, or a blank template, etc. An AI-powered builder provides trigger and action suggestions for a user when creating the data connection, thereby minimizing manual efforts and operations. A pre-built builder allows a user to create the data connection based on templates. A user can also choose to automate his/her workflow from scratch.

In some embodiments, the data connection creation process includes adding a trigger, adding one or more actions, naming the data connection/automation, adjusting advanced settings, adjusting details, and publishing the automation. It should be noted that some steps of this process may be optional, for example, the user can choose not to adjust advanced settings.

Figure 2:
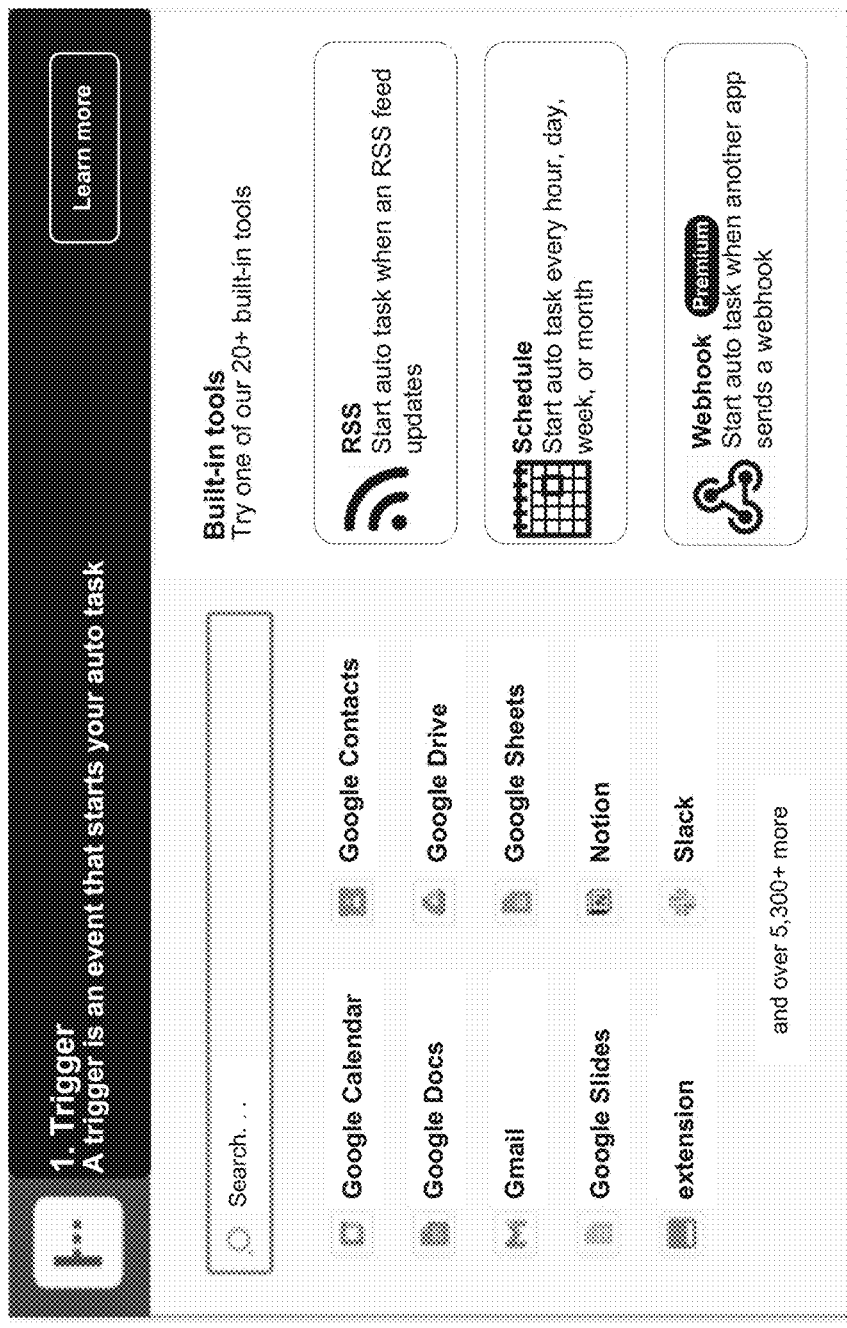
FIG. 2 illustrates an exemplary user interface for adding a trigger in an automated workflow, according to some embodiments.

A trigger is an event (e.g., a new lead, a new subscriber) that starts automation. For example, if a user wants to create an automated flow to send a direct message in Slack to herself/himself every time the user receives a new email in Gmail. The trigger here should be the new email in Gmail. To add a trigger, in some embodiments, the present platform may allow a user to choose a trigger app, select an event, select an app account, set up the trigger, and test the trigger. One or more trigger options may also be set up to fit the user's needs. FIG. 2 shows an exemplary user interface (UI) 200 used for a user to add a trigger in an automated flow. It should be noted multiple UIs (not shown) can be used to add the trigger.

In general, a trigger of an automation/automated flow connects to the chosen app's API to get new data about the trigger event. In some embodiments, a trigger can be a polling trigger or an instant trigger. Most APIs require apps to ask for new data periodically, i.e., polling for new data. Typically, with a polling trigger, data is requested every 1 to 15 minutes to start the automation. An instant trigger works by using webhooks, i.e., automated notifications sent between apps. Whenever there is new data, the present automation platform allows the app to notify the automation as soon as that data is added to the app. In the present automation platform, there are vast infrastructure for polling and webhook ingesting to act as real-time triggers on new data.

Once the trigger is added, the present automation platform allows the user to add one or more actions. An action is an event that the user wants the automation to perform after the trigger occurs. Action events vary between different apps and app types. For example, a spreadsheet app might have an action event to "create" a new row while another app's event is to "add" a new row. Responsive to the selection of action, the platform now guides the user to connect the user's app account and customize the action event (e.g., notifying what information from the chosen app should be sent to the action). Subsequent to the configuration of action, connections between apps are established and corresponding automated workflow may be initiated to automatically perform tasks on behalf of the user.

Data Retrieval and Sync

As discussed above, the present automation platform can link different apps and services together. Based on the data connections between apps and services created using automations or automated flows, the present platform may determine how to read data from a number of sources (including crawling and indexing private API data for retrieval) and determine how to keep the data synced among different apps and databases. In particular, the present platform allows users to perform data retrieval and analysis, as well as semantic search from information of various apps received through the data connections.

In some embodiments, to perform data retrieval (e.g., private API data) using embeddings and vector indices, the present system may first get access and authentication to the private APIs. For example, the present system may obtain credentials (e.g., API keys, token) to access a private API or implement an authentication flow to obtain access tokens. The present system also obtains knowledge of API request methods (e.g., "GET," "POST"), data rate limits, and response formats (e.g., XML, JSON) to communicate with a private API. Once the data retrieval request is made, the present system may retrieve the data (e.g., based on handling pagination to ensure a complete data retrieval).

The present system may process the retrieved data, for example, by cleaning and formatting the data to fit the indexing needs based on filtering fields, converting data types, etc. The present system may then index the retrieved data, for example, by defining how the data is structured in the database for efficient querying and retrieval. The present system may further implement error handling, monitor API changes, and regularly check the quality and integrity of the indexed data, ensuring the data stays updated on one or more data stores (e.g., 108).

The present system also synchronizes the data across all the connected apps. For example, the present system may utilize APIs to facilitate data exchange between applications, and/or use webhooks for real-time data updates. The present system may further implement logging and monitoring to track synchronization status and address errors quickly.

Described herein in FIGS. 3A-3K includes example use cases for performing data retrieval and sync based on integration of automated workflow with HubSpot®. HubSpot is one of thousands of third-party applications with which the present system can create data connections. While the description hereafter is based on HubSpot, the use of HubSpot herein is merely for illustration, and any other customer relationship management (CRM) products or other apps (where data connection can be created) may be used.

HubSpot is a CRM platform that connects a client's marketing, sales, content management, and customer service teams. It helps different teams navigate and chart opportunities by creating a database of contacts, leads, and customers, and tracking their interactions with websites, emails, social media, and other channels, in a single seamless package. Although HubSpot may suit many of the client's needs, it has to be updated with other apps to keep up with the client's business scales.

The present workflow automation tool can bridge the gap by automating data transfer across various apps, that is, enabling HubSpot CRM users to send, store, and synchronize data seamlessly between HubSpot and other applications. For example, when a user is generating contacts in another app, the present system can automatically send these contacts to HubSpot so the user's email list is updated, pristine, and accurate in real time. Conversely, the present system allows the user to kick off workflows in other apps/tools when contacts, deals, or companies are updated in HubSpot CRM.

Figure 3A:
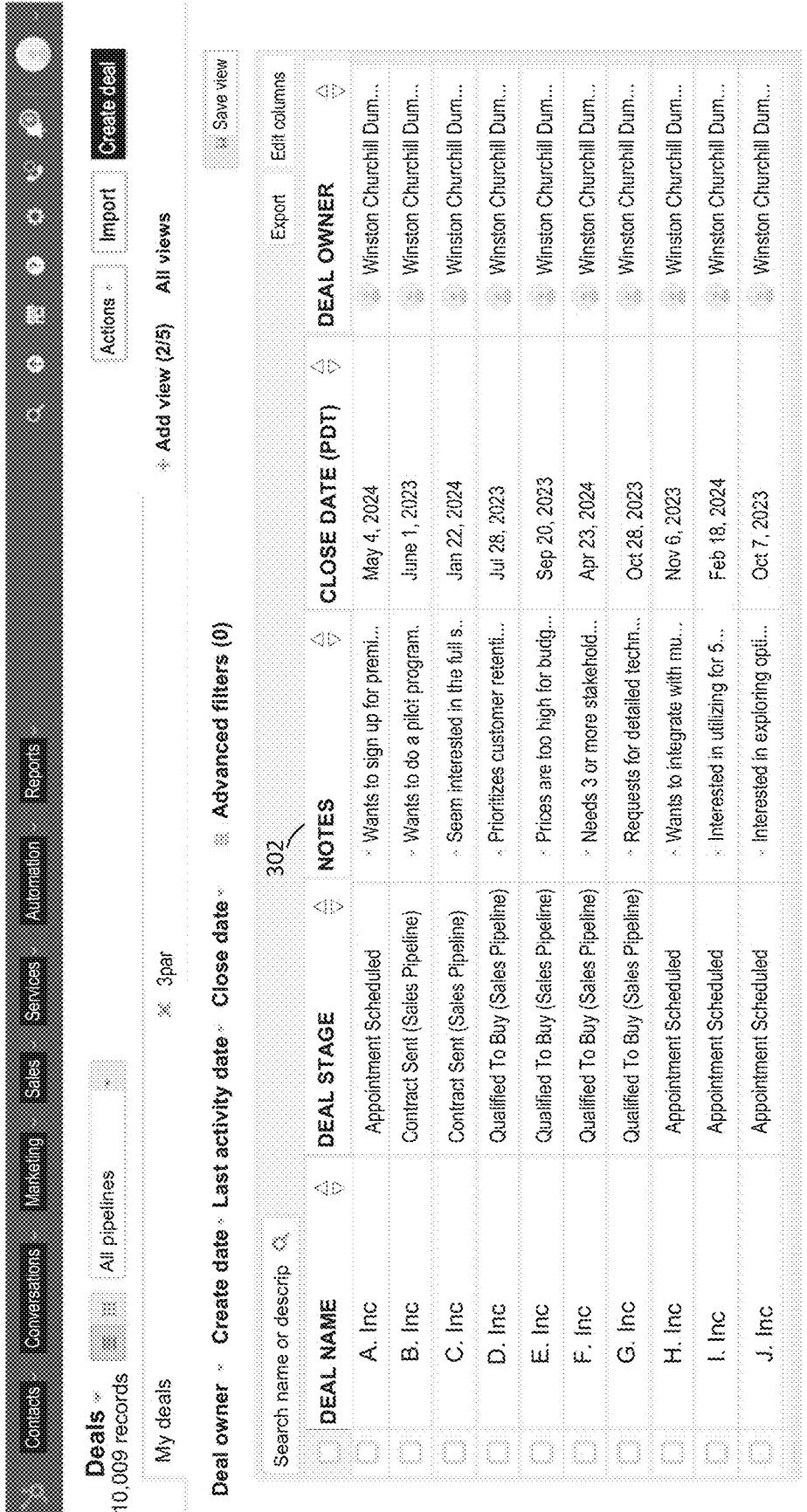

As shown in FIGS. 3A-3K, the present system offers users the power and consistency of a technical solution with the agility to update and sync with the apps and services. FIG. 3A shows the source data from a third-party app HubSpot, in particular, deal data in HubSpot. A deal tracks potential revenue through a sales process. Each deal may be associated with other source data/records, such as contacts and companies involved in the deal. In this example, each deal has a deal name, deal stage, predicated close date, deal owner, and notes. Notes 302 can be a short description of the specific feature(s) of a deal such as when the deal is expected to close. The present system allows users to create a data connection with HubSpot or have access to the data in HubSpot such that, for example, trigger-action pairs related to the deal records of HubSpot can be configured and the action(s) can be automatically performed upon a trigger event. Moreover, the present system allows automatic data retrieval and analysis, semantic search, and synchronization on the data of the connected third party app.

Figure 3B:
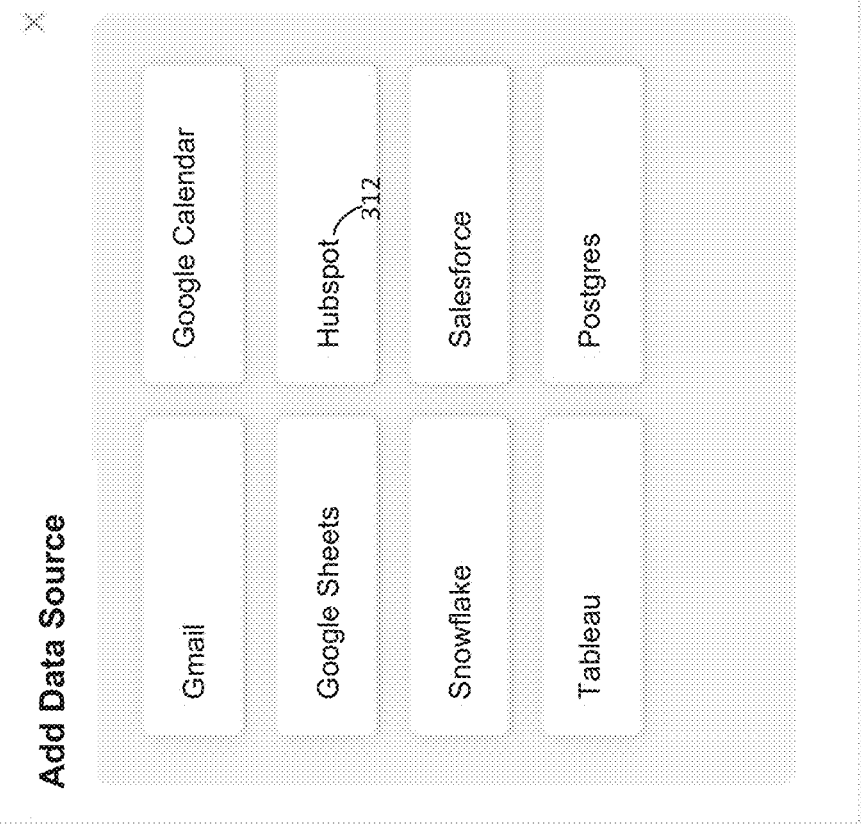

FIG. 3B provides an interface (e.g., a pop-up dialog) for a user to select a data source (e.g., HubSpot 312) from thousands of connected data sources/apps, and initiates certain actions/operations on the data retrieved from the selected data source/app based on the data connection with the selected data source.

Figure 3C:
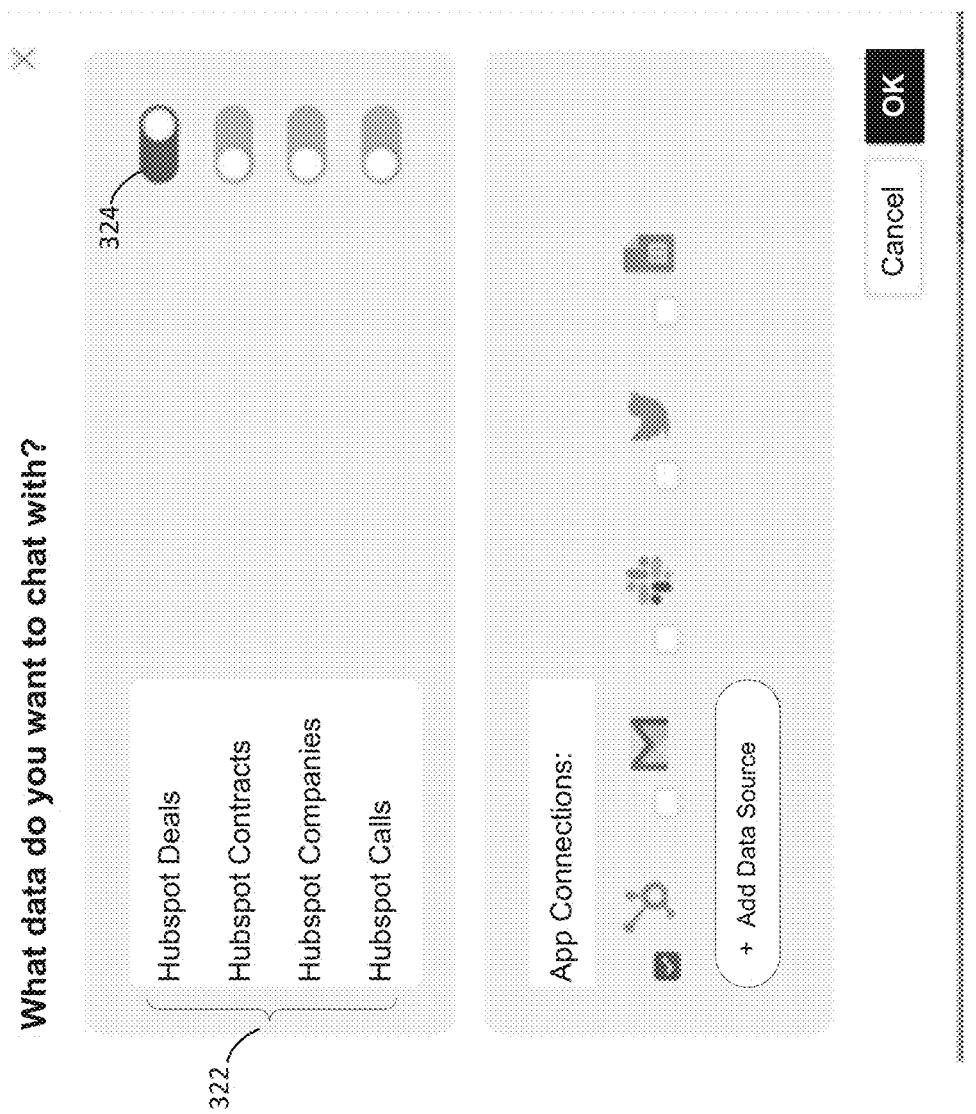

The present system allows a user to connect to a knowledge source and tailor the responses for the user's business or project through an interface, e.g., an Interface AI Chatbot. Once HubSpot 312 is selected as a data source, FIG. 3C shows granular control of various components of HubSpot. The present system allows the user to refine the layer of connections to permit access to certain data while protecting other data. For example, among the HubSpot components 322 including deals, contacts, companies, and calls, the user may be interested in managing or automating tasks associated with the vast number of deals. As a result, the user can select only deals for further operations as indicated by the selection of HubSpot deals 324.

The present system supports copying data when starting a new app, i.e., populating that app with existing information. Many apps allow users to manually export data to a comma-separated values (CSV) file, but there is a limited amount of data users can filter. Often users may also need to clean up the information before uploading the file to the app of choice, which can be time-consuming. The present system allows efficient and accurate bulk data retrieval or transfer, such as the 10,000+ deal records in this example.

FIG. 3D lists the HubSpot data source status in 332. In this example, the status is operational, which means that the user's HubSpot account has been connected, and semantic search, data retrieval and update, and data sync can be conducted. In some embodiments, this status indicator may show that the data has been made available or indexed for further operations such as semantic search.

As mentioned above, an AI chatbot may be incorporated into the present system to facilitate system operations. With an AI chatbot, a user can interact with the present system through natural language instructions. Through natural language processing and machine learning, the present system can train one or more AI models (e.g., LLMs) to learn the task the user wants the chatbot to perform, and further perform a semantic search to generate an appropriate result for the user.

Figure 3E:
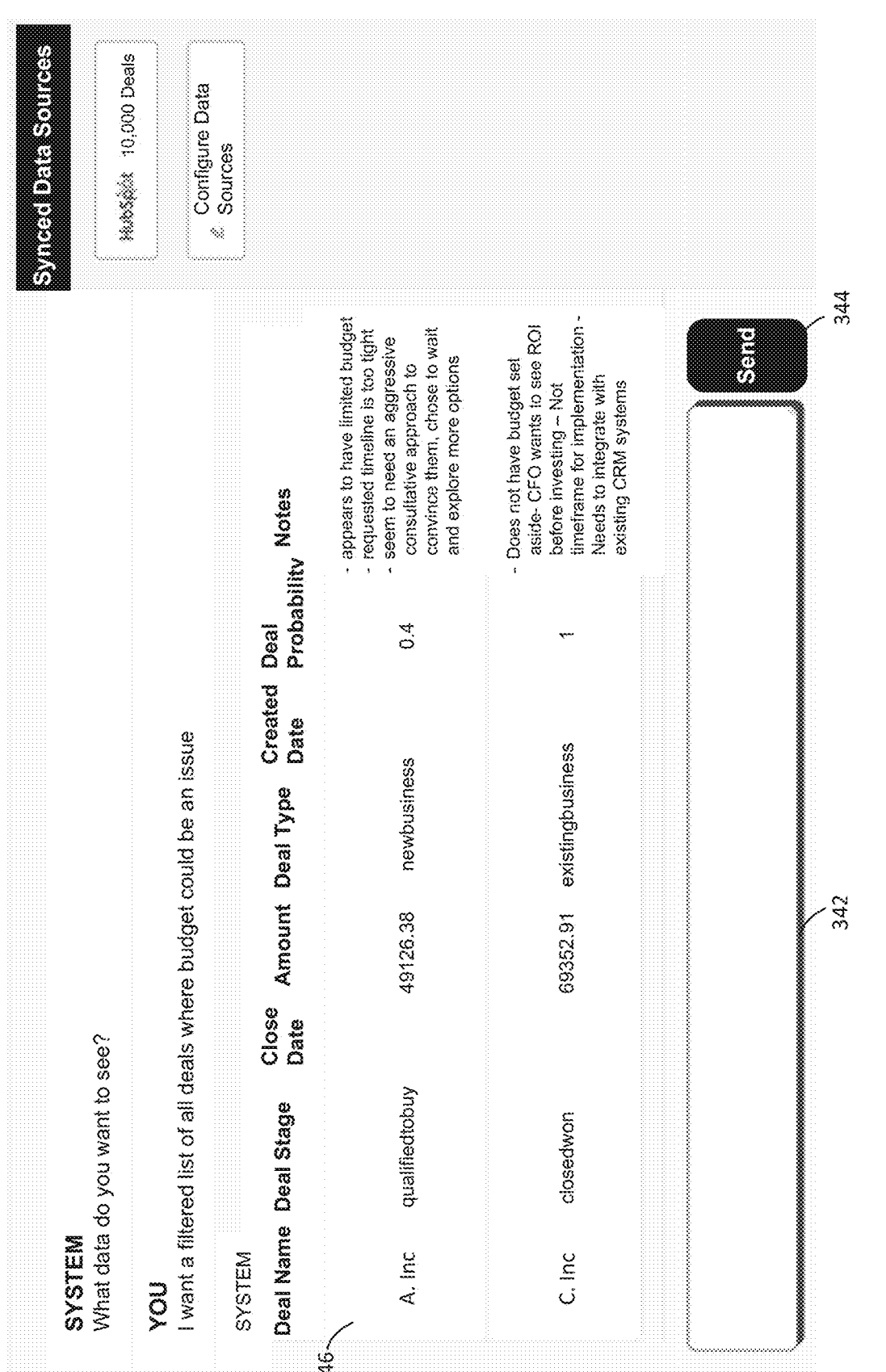
Figure 3F:
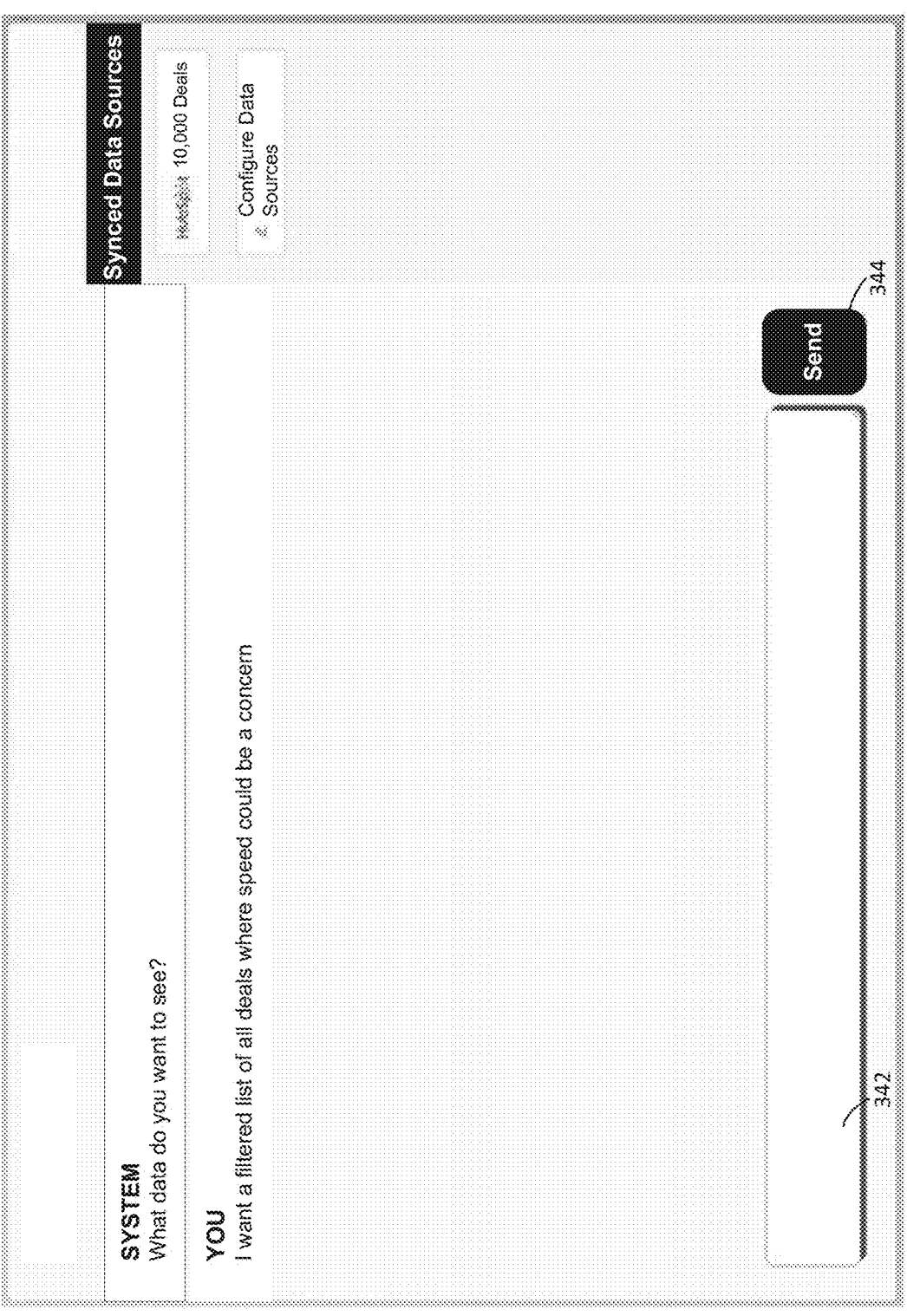
Figure 3G:
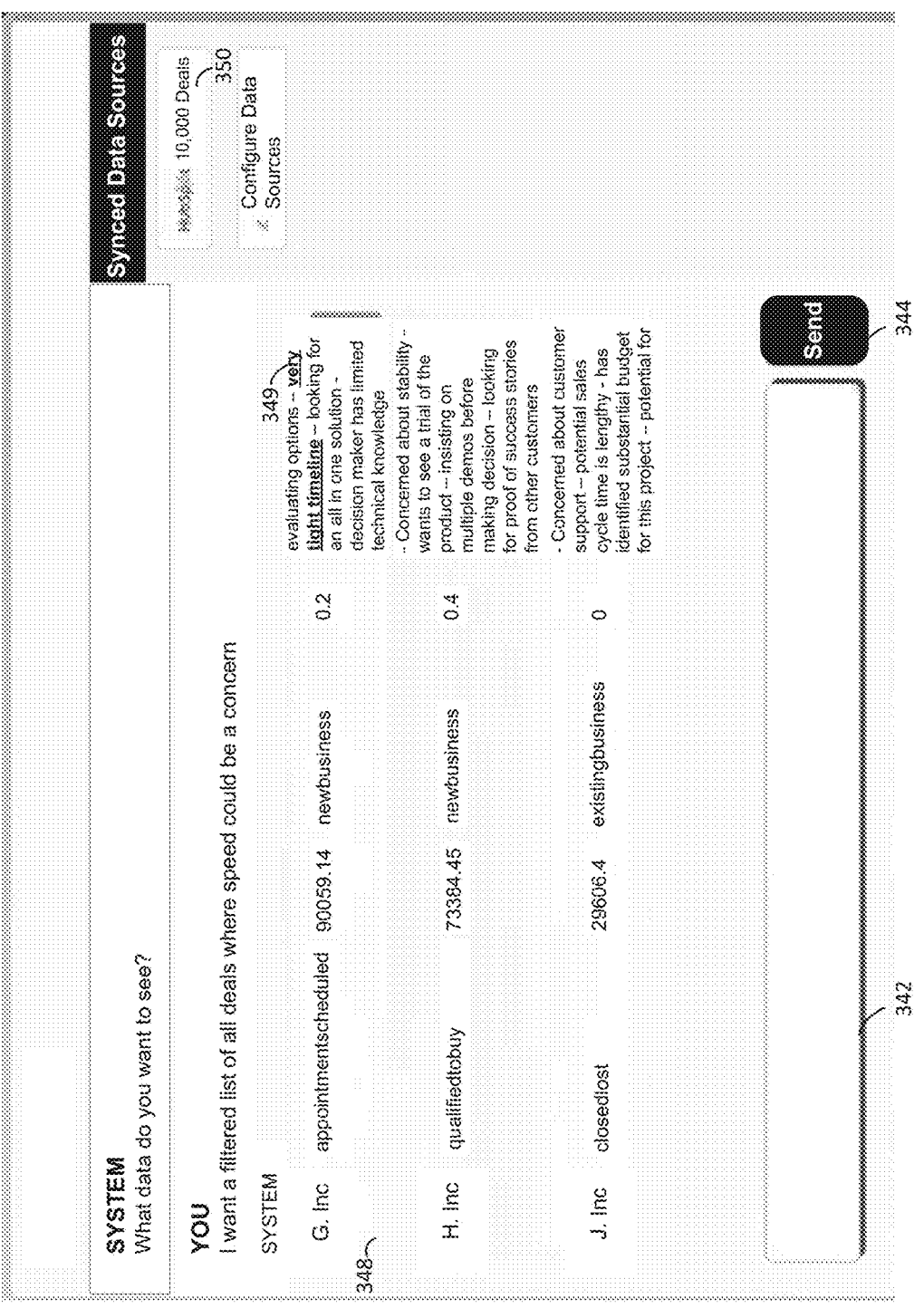

FIGS. 3E-3G illustrate the chatbot interfaces where a user may write and submit an instruction using tabs 342 and 344. For example, in FIG. 3E, the system/chatbot asks "What data do you want to see?" and the user can write a directive to tell the chatbot that "I want a filtered list of all deals where budget could be an issue." Therefore, using a simple answer in the AI chatbot interface of the present system, the present system can be configured to perform a user-specified action when new data of any deal with the budget at issue is received. FIG. 3E shows a filtered list in 346 responsive to successfully performing the action of semantic search for displaying "a filtered list of all deals where budget could be an issue." The criteria for evaluating whether a deal has a budget issue may be different, e.g., depending on the user's configuration. In this example, the "Notes" associated with these two deals include comments about limited budget and no set-aside budget.

The present system supports data retrieval based on one or more of predicates, complex data analysis, and semantic search. In some embodiments, the present system may perform data retrieval to locate and return data records based on predicates of properties associated with the records (e.g. "What customers increased their spend in the last week in Italy?"). The present system may also apply complex data analysis to enable data aggregation descriptions in natural language for users (e.g. "What are the average sales for each sales person by day?"). Further, the technology described herein may generate a query language expression and/or programming code based on natural language question(s). In some embodiments, the code is executed on the underlying data, and the result from executing the code is then used to prepare a natural language answer.

The present system supports semantic search. Unlike keyword search returning results that match words to words, words to synonyms, or words to similar words, semantic search looks to match the meaning of the words in the user query. In some cases, semantic search might not generate results with direct word matches, but it will match the user's intent, as shown in FIGS. 3F and 3G.

In FIG. 3F, the user inquiries about "all deals where speed could be a concern." Once such new data/trigger is detected by the present system, the action of a semantic search for displaying "all deals where speed could be a concern" is performed. As a result, a different filtered list 348 including three different deals is automatically generated and displayed in FIG. 3G. Particularly, as "Notes" 349 shows, the deal "G. Inc" has a "very tight timeline," which does not include the keyword "speed" but is semantically similar to the user query.

In the present system, as shown in FIGS. 3E-3G, there are vast infrastructure for polling and webhook ingestion to act as real-time triggers on new data. Whenever there is new data, the present system updates the database of known records to include the new/changed/deleted records. Responsive to the task implementation, the corresponding database(s) will also be updated and synced. The distinguished features of bulk data retrieval and corresponding data sync as described in this disclosure are used to address important technical issues, for example, the existing API endpoints prevent retrieval of large amounts of data in bulk, third-party apps do not have semantic search endpoints, lack of notifications to keep context up-to-date, etc.

Figure 3H:
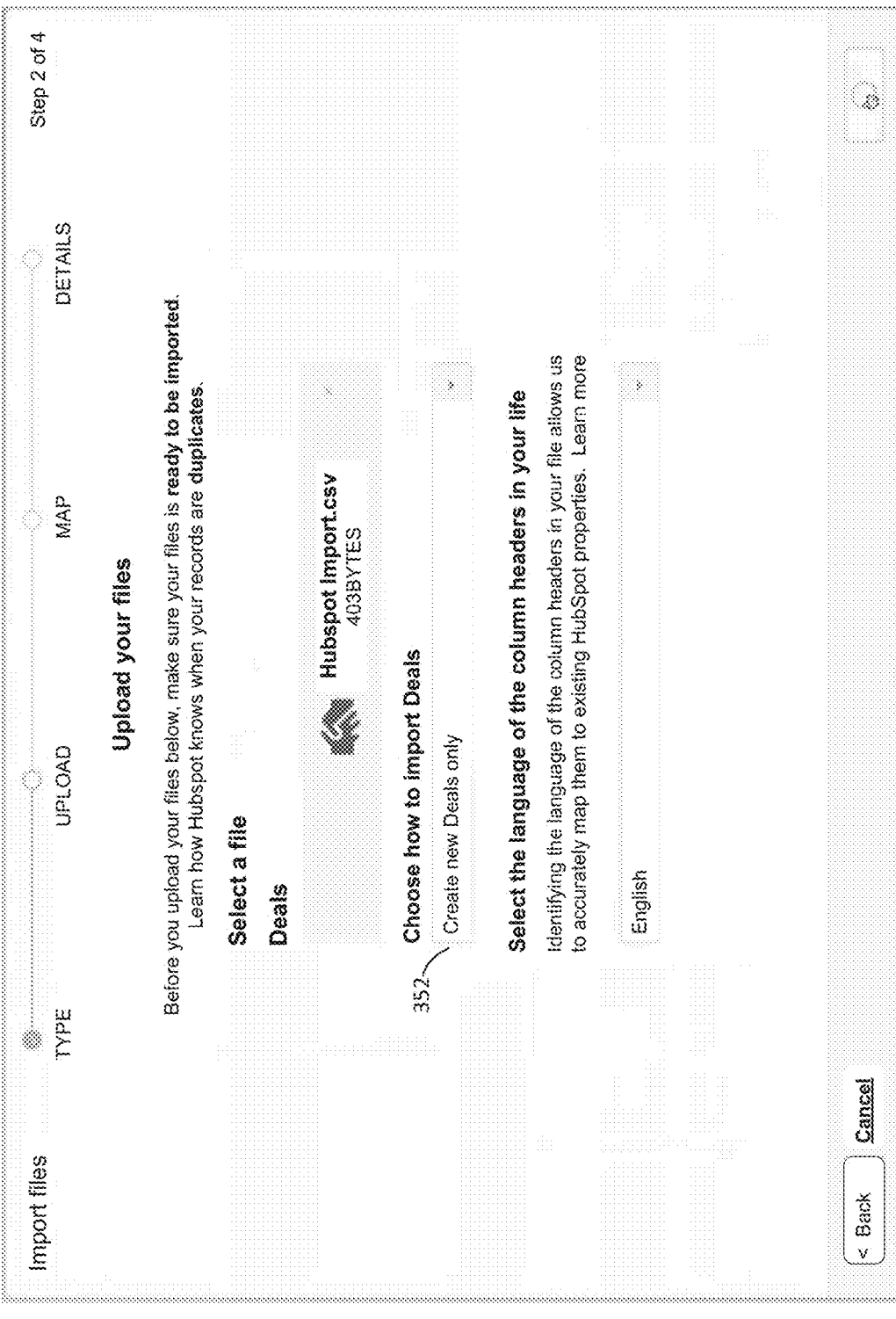
Figure 3I:
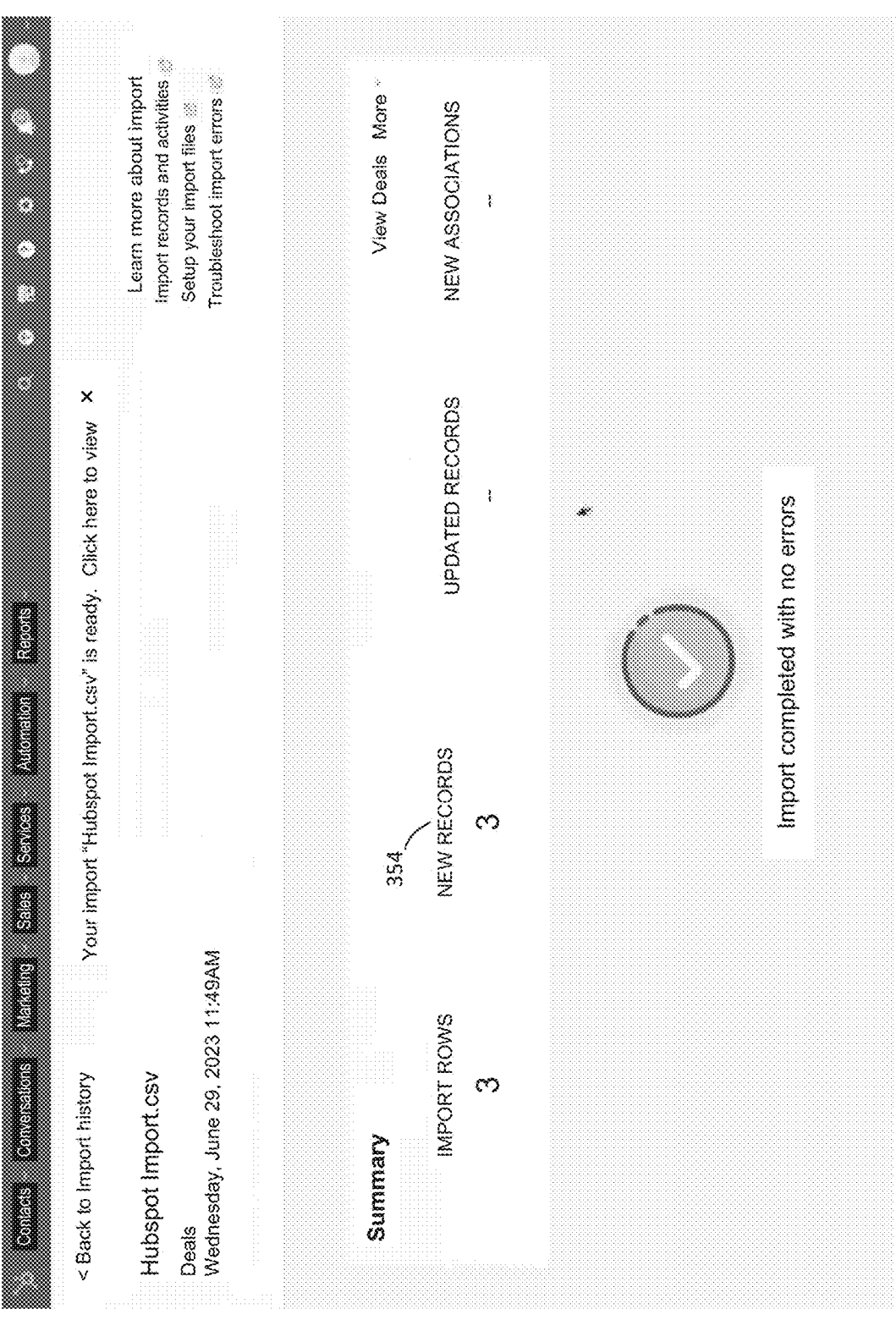

In FIGS. 3E-3G, the synced data source of HubSpot includes 10000 deals (e.g., shown in 350 of FIG. 3G), and the semantic search results are based on these 10000 deals. FIGS. 3I and 3H are interfaces where new deal records are imported into HubSpot. The data objects in HubSpot can be companies, deals, contacts, etc., and an instance of each object is a record. HubSpot can track down different objects and get object data into the CRM, e.g., using an import tool shown in these figures. In this example, the deal data is imported when one or more new deals are created as configured in 352 of FIG. 3H. Three new records are imported into HubSpot as shown in 354 of FIG. 3I.

The present system can automatically fetch updates from HubSpot and sync the data, for example, based on the data connections/automated flows with HubSpot. As a result, once a user uploaded three new deals in HubSpot (as in FIGS. 3H and 3I), the present system automatically fetches this new data and updates the database for further operations. For example, the updated filter lists are shown in FIGS. 3J and 3K.

Figure 3J:
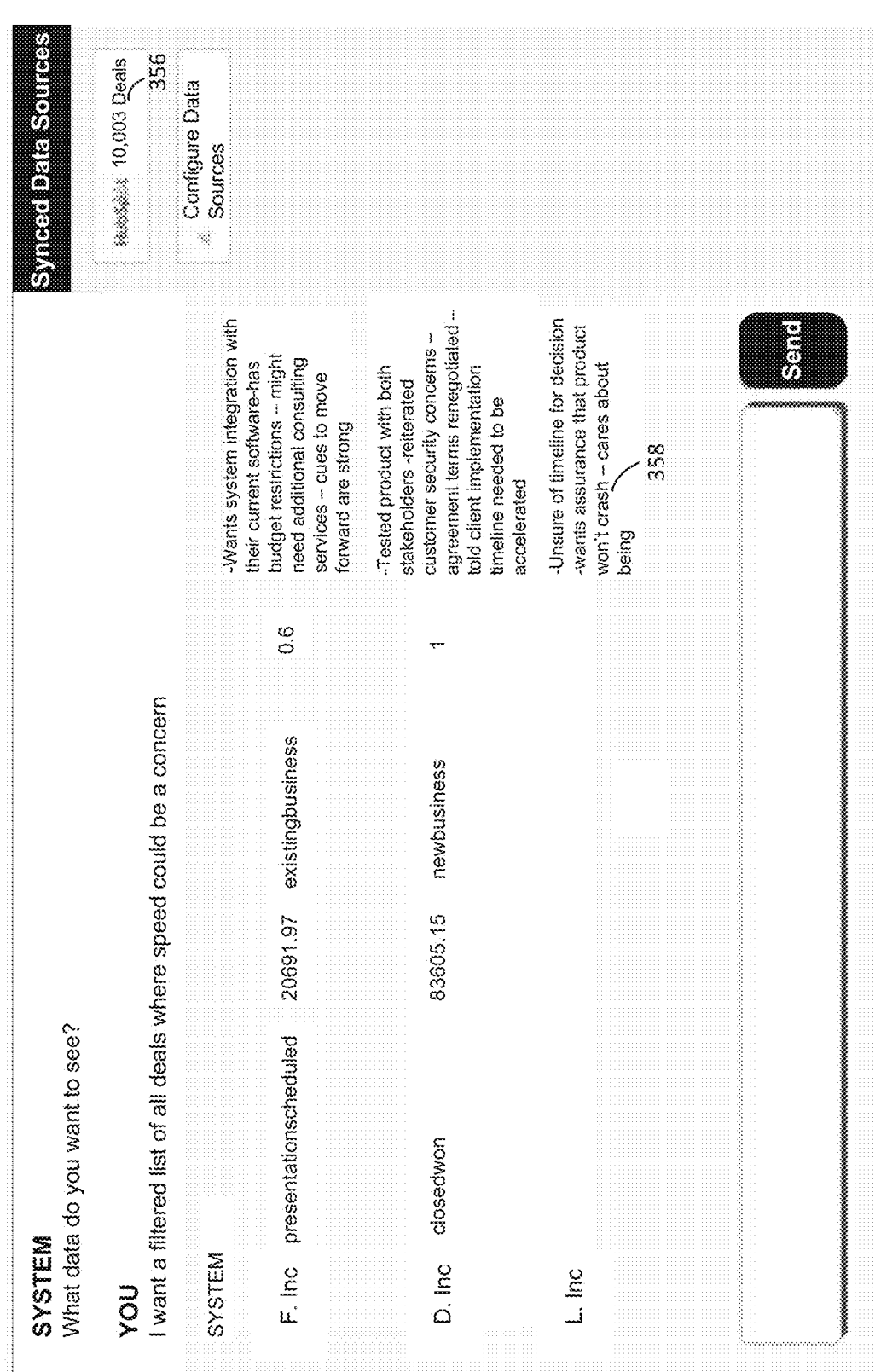
Figure 3K:
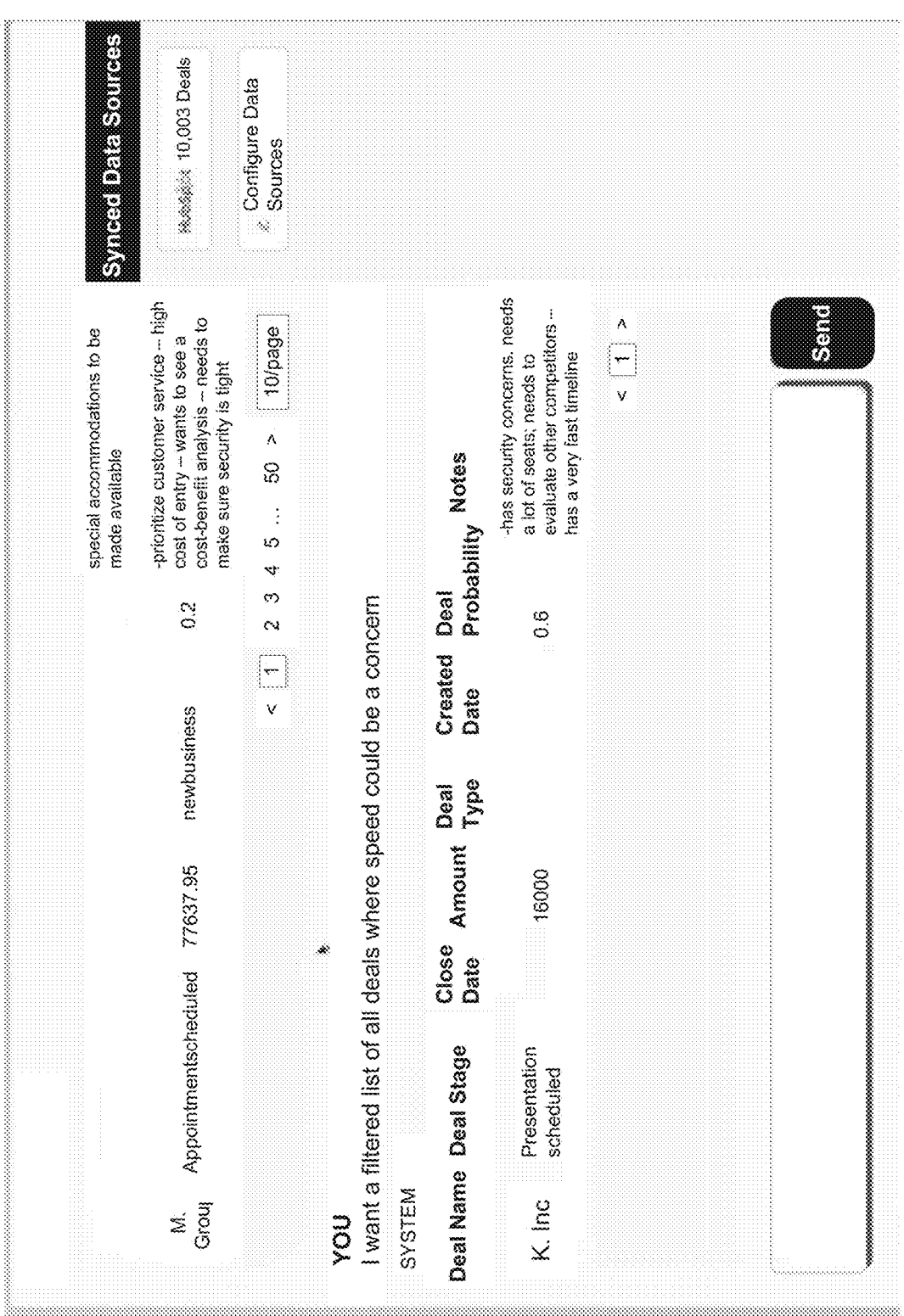

After the three new deals were entered into HubSpot, the present system automatically fetches the new data from HubSpot, such that the total number of deals in the database of the present system is 10003 as shown in 356 of FIG. 3J. Responsive to the updated deals in the database, the present system updates the semantic search results to generate new filtered lists. In FIG. 3J, the search result includes three new deals based on semantic search. For example, the deal "L. Inc." has an uncertain timeline and "wants assurance that product won't crash" in 358, indicating another semantic similarity with the user query of "speed" concern.

The present system supports one-time data transfer to move a large amount of data for a big project. In some embodiments, the present platform may also move data on a regular basis. For example, the user can schedule a transfer to automatically find and update existing records—or create new ones if nothing is found—ensuring that the user has the latest and most accurate data for decision-making.

The present system also allows the migration of historical data for automations/automated flows. Once an automation is turned on, the present system will perform actions for the user from that point forward. But an automation cannot perform actions on pre-existing items. Therefore the present system uses a transfer operation to help the user to move that historical data from selected apps.

As shown in FIGS. 3A-3K, the present system uses an automation platform in combination with HubSpot to eliminate the tedious and error-prone manual work involved in managing users' deals, by automatically moving data in and out of HubSpot and triggering various types of actions/tasks. Flowchart FIG. 4 illustrates an exemplary flowchart 400 for performing automatic data retrieval and synchronization, according to some embodiments. At step 402, the present system receives a selection of an application (e.g., selecting Hubspot in FIG. 3B) from multiple connected applications (e.g., typically, third party apps) from a user. In some embodiments, one or more automation flows are created to establish data connections between multiple apps, i.e., connecting the multiple apps. From these apps, a user may select an arbitrary app from the connected multiple apps. Once new data is received in the selected app, an action is performed in the selected app, and/or a result is generated in the app, the new data and the action result may be automatically transferred to the other connected apps to keep the data consistent on all the connected apps.

At step 404, the present system determines, using one or more trained AI models, an action to be performed on the selected app. In some embodiments, the action can be included in a natural language instruction. For example, as shown in FIG. 3G, the action description is "I want a filtered list of all deals where speed could be a concern." The present system may train one or more AI models through natural language processing and machine learning to learn the action (e.g., the natural language instruction) to be performed.

Given the determined action, at step 406, the present system retrieves data from the selected app. In some embodiments, this data retrieval may include automatic new data fetch. That is, if new data (e.g., 10 new deals) are brought into the selected app (e.g., Hubspot), the present system can identify and retrieve the new data and apply the most recent data when performing the action. In some embodiments, the present system may use embeddings and one or more vector indices to retrieve the data used to perform the action. In some embodiments, the present system may perform the data retrieval based on one or more of predicates, complex data analysis, and semantic search.

At step 408, the present system performs the action to generate a result based on the retrieved data. For example, the result may be a natural language answer generated from performing the action.

At step 410, the present system automatically transfers the new data and the result to the remaining applications of the multiple connected apps for synchronization. In addition, the present system supports bulk data loading, i.e., transferring a large amount of data among the multiple connected applications at one time or on a regular basis. In some embodiments, the present system may populate any of the multiple connected applications with existing information using the bulk-transfer mechanism.

Computer-Based Implementations

In some examples, some or all of the processing described above can be carried out on a personal computing device, on one or more centralized computing devices, or via cloud-based processing by one or more servers. Some types of processing can occur on one device and other types of processing can occur on another device. Some or all of the data described above can be stored on a personal computing device, in data storage hosted on one or more centralized computing devices, and/or via cloud-based storage. Some data can be stored in one location and other data can be stored in another location. In some examples, quantum computing can be used and/or functional programming languages can be used. Electrical memory, such as flash-based memory, can be used.

Figure 5:
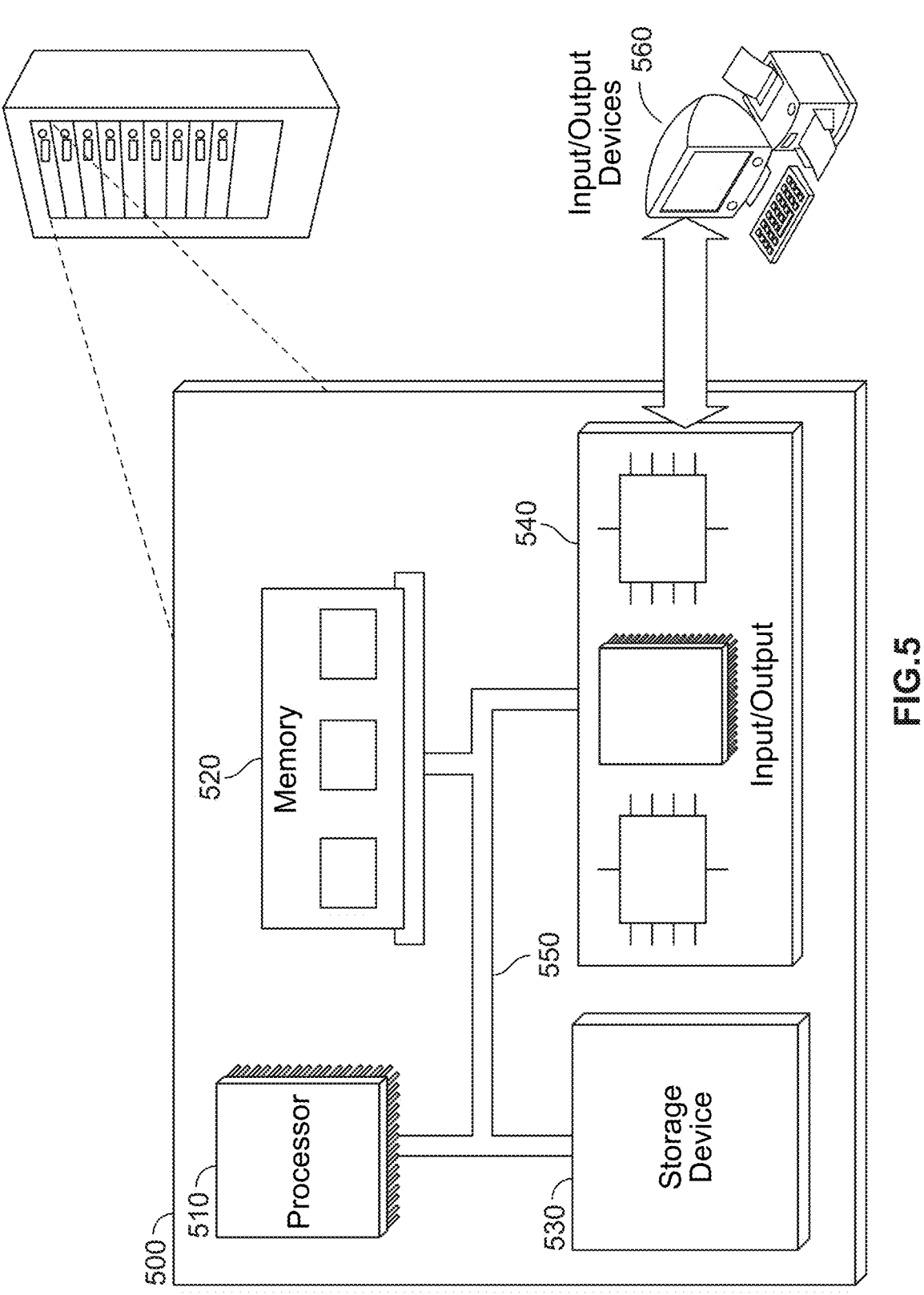
FIG. 5 illustrates a block diagram of an example computer system that may be used in implementing the technology described herein, according to some embodiments.

FIG. 5 is a block diagram of an example computer system 500 that may be used in implementing the technology described herein. General-purpose computers, network appliances, mobile devices, or other electronic systems may also include at least portions of the system 500. The system 500 includes a processor 510, a memory 520, a storage device 530, and an input/output device 540. Each of the components 510, 520, 530, and 540 may be interconnected, for example, using a system bus 540. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530.

The memory 520 stores information within the system 500. In some implementations, the memory 520 is a non-transitory computer-readable medium. In some implementations, the memory 520 is a volatile memory unit. In some implementations, the memory 520 is a non-volatile memory unit.

The storage device 530 is capable of providing mass storage for the system 500. In some implementations, the storage device 530 is a non-transitory computer-readable medium. In various different implementations, the storage device 530 may include, for example, a hard disk device, an optical disk device, a solid-state drive, a flash drive, or some other large capacity storage device. For example, the storage device may store long-term data (e.g., database data, file system data, etc.). The input/output device 540 provides input/output operations for the system 500. In some implementations, the input/output device 540 may include one or more network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 560. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 530 may be implemented in a distributed way over a network, such as a server farm or a set of widely distributed servers, or may be implemented in a single computing device.

Although an example processing system has been described in FIG. 5, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special-purpose logic circuitry, e.g., an FPGA (field programmable gate array) or an ASIC (application-specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program can include, by way of example, general or special purpose microprocessors or both, or any other kind of central processing unit. Generally, a central processing unit will receive instructions and data from a read-only memory, a random access memory, or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special-purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Each numerical value presented herein, for example, in a table, a chart, or a graph, is contemplated to represent a minimum value or a maximum value in a range for a corresponding parameter. Accordingly, when added to the claims, the numerical value provides express support for claiming the range, which may lie above or below the numerical value, in accordance with the teachings herein. Absent inclusion in the claims, each numerical value presented herein is not to be considered limiting in any regard.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. The features and functions of the various embodiments may be arranged in various combinations and permutations, and all are considered to be within the scope of the disclosed invention. Accordingly, the described embodiments are to be considered in all respects as only illustrative and not restrictive. Furthermore, the configurations, materials, and dimensions described herein are intended as illustrative and in no way limiting. Similarly, although physical explanations have been provided for explanatory purposes, there is no intent to be bound by any particular theory or mechanism, or to limit the claims in accordance therewith.

What is claimed is:

1. A method for automatic data retrieval and synchronization comprising:

receiving a selection of an application from a plurality of connected applications;

determining, using one or more trained artificial intelligence (AI) models, an action to be performed on the selected application;

retrieving data used to perform the action from the selected application by crawling and indexing the data using at least one authenticated private application programming interface (API) of the selected application, wherein retrieving the data includes automatically fetching new data updates of the selected application;

performing the action to generate a result based on the retrieved data; and automatically transferring the new data updates and the result to remaining applications of the plurality of connected applications for synchronization.

2. The method of claim 1, wherein the data is retrieved from the selected application using embeddings and one or more vector indices.

3. The method of claim 1, further comprising bulk-transferring a large amount of data among the plurality of connected applications at one time or on a regular basis.

4. The method of claim 3, further comprising, prior to the new data updated on the selected application, populating the application with existing information using the bulk transfer.

5. The method of claim 1, further comprising:

creating one or more automation flows to establish data connections between the plurality of connected applications, wherein the data is retrieved from the selected application based on the data connections between the plurality of connected applications.

6. The method of claim 5, further comprising performing a semantic search on data received from the plurality of connected applications through the data connections.

7. The method of claim 5, wherein creating the one or more automation flows further comprises:

generating one or more user interfaces to provide instructions and receive user input for configuring one or more trigger events and one or more subsequent actions performed upon receiving the one or more trigger events.

8. The method of claim 5, wherein the one or more automation flows are created using one or more AI models, wherein the one or more AI models are trained to provide parameters or input required for creating the one or more automation flows to reduce manual operations.

9. The method of claim 1, further comprising training the one or more AI models through natural language processing and machine learning to determine the action to be performed.

10. The method of claim 1, wherein the action is included in a natural language instruction, and the result is a natural language answer generated from performing the action.

11. A system for automatic data retrieval and synchronization comprising:

a processor; and a memory in communication with the processor and comprising instructions which, when executed by the processor, program the processor to:

receive a selection of an application from a plurality of connected applications;

determine, using one or more trained artificial intelligence (AI) models, an action to be performed on the selected application;

retrieve data used to perform the action from the selected application by crawling and indexing the data using at least one authenticated private application programming interface (API) of the selected application, wherein retrieving the data includes automatically fetching new data updates of the selected application;

perform the action to generate a result based on the retrieved data; and automatically transfer the new data updates and the result to remaining applications of the plurality of connected applications for synchronization.

12. The system of claim 11, wherein the data is retrieved from the selected application using embeddings and one or more vector indices.

13. The system of claim 11, wherein the instructions further program the processor to bulk-transfer a large amount of data among the plurality of connected applications at one time or on a regular basis.

14. The system of claim 13, wherein, prior to the new data updated on the selected application, the instructions further program the processor to populate the application with existing information using bulk-transfer.

15. The system of claim 11, wherein the instructions further program the processor to:

create one or more automation flows to establish data connections between the plurality of connected applications, wherein the data is retrieved from the selected application based on the data connections between the plurality of connected applications.

16. The system of claim 15, wherein the instructions further program the processor to perform one or more of a semantic search on data received from the plurality of connected applications through the data connections.

17. The system of claim 15, wherein, to create the one or more automation flows, the instructions further program the processor to:

generate one or more user interfaces to provide instructions and receive user input for configuring one or more trigger events and one or more subsequent actions performed upon receiving the one or more trigger events.

18. The system of claim 11, wherein the instructions further program the processor to train the one or more AI models through natural language processing and machine learning to determine the action to be performed.

19. The system of claim 11, wherein the action is included in a natural language instruction, and the result is a natural language answer generated from performing the action.

20. A computer program product for automatic data retrieval and synchronization, the computer program product comprising a non-transitory computer-readable medium having computer readable program code stored thereon, the computer readable program code configured to:

receive a selection of an application from a plurality of connected applications;

determine, using one or more trained artificial intelligence (AI) models, an action to be performed on the selected application;

retrieve data used to perform the action from the selected application by crawling and indexing the data using at least one authenticated private application programming interface (API) of the selected application, wherein retrieving the data includes automatically fetching new data updates of the selected application;

perform the action to generate a result based on the retrieved data; and automatically transfer the new data updates and the result to remaining applications of the plurality of connected applications for synchronization.

* * * * *